US006226524B1

(12) United States Patent
Allen et al.

(10) Patent No.: US 6,226,524 B1
(45) Date of Patent: May 1, 2001

(54) METHOD OF AUTOMATICALLY SELECTING TALK-AROUND MODE OR REPEATER MODE DEPENDING ON REPEATER AVAILABILITY

(75) Inventors: Vernon Anthony Allen, Sunrise; Ali Almutairi, Gainsville, both of FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/221,441

(22) Filed: Dec. 28, 1998

(51) Int. Cl.[7] .............................. H04B 7/00; H04B 3/36

(52) U.S. Cl. .............................. 455/509; 455/517; 455/7

(58) Field of Search .............................. 455/11.1, 9, 7, 455/13.1, 509, 517, 553, 445, 550, 422, 403, 450, 451, 452, 519, 520, 15; 370/337, 347, 445, 461

(56) References Cited

U.S. PATENT DOCUMENTS 5,423,055 * 6/1995 Diaz et al. .............................. 455/15
5,666,661 * 9/1997 Grube et al. .............................. 455/509
5,887,265 * 3/1999 Tang et al. .............................. 455/509
5,978,367 * 11/1999 Kinnunen et al. .............................. 370/337

* cited by examiner

*Primary Examiner*—Tracy Legree
(74) *Attorney, Agent, or Firm*—Andrew S. Fuller

(57) ABSTRACT

A subscriber unit automatically selects repeater access mode, if a repeater is available, or talk-around mode, if a repeater is not available (500). The subscriber unit initiates a call by transmitting a call setup request on the outbound channel used by the repeater (510), and by monitoring the outbound channel to detect a response from the repeater (520). If a response is received within a timeout period, the subscriber unit continues the call by transmitting on the inbound channel (530, 540). Otherwise, the subscriber unit continues the call using talk-around mode, by transmitting on the outbound channel (530, 550). In this process, the repeater monitors the outbound channel to determine when a call setup request is transmitted by the subscriber unit (610), and responds accordingly on the outbound channel (620, 630), thereby indicating its availability. The repeater then monitors the inbound channel and retransmits, or repeats, signals received via the inbound channel, on the outbound channel (640, 650, 660).

14 Claims, 5 Drawing Sheets

METHOD OF AUTOMATICALLY SELECTING TALK-AROUND MODE OR REPEATER MODE DEPENDING ON REPEATER AVAILABILITY

TECHNICAL FIELD

This invention relates in general to radio communication systems, and more particularly, radio systems having subscriber units capable of operating in talk-around mode or repeater assisted mode.

BACKGROUND OF THE INVENTION

Repeaters have long been used in conventional two-way radio systems to extend the coverage range of subscriber units operating in such systems. A repeater operates by receiving communication signals transmitted by a particular subscriber unit on an inbound channel, and by retransmitting the signals at a higher power level on an outbound channel. Subscriber units participating in such radio systems generally have channels programmed to operate in conjunction with a repeater. However, it is common to provide such units with direct unit to unit communication ("talk-around") capability, i.e., the ability to communicate without the aid of a repeater or other infrastructure equipment, in order to support localized or emergency communication when a repeater is not available.

In a typical system, a subscriber unit initiates a call in repeater mode by transmitting a call setup request to the repeater, which request may contain synchronization and control information. Generally, the repeater monitors its inbound channel for an incoming call setup request from an initiating subscriber unit. The repeater responds by executing a call setup procedure that includes transmitting call information received from the initiating subscriber unit on the inbound channel to a corresponding outbound channel. A targeted subscriber unit monitoring the outbound channel receives the transmitted information and the call is completed.

In talk-around mode, the initiating subscriber unit makes a call by transmitting on a channel expected to be monitored by the targeted subscriber unit. Talk-around capability is usually provided on a limited number of channels which are separate from the repeater mode channels. Thus, a user must select one channel or another in order to operate in repeater mode or in talk-around mode. Such user interaction adds complexity to a call setup process because the user must decide whether to initiate a call on a repeater inbound channel or on a talk-around channel, and the target subscriber unit must also be monitoring the correct channel to complete the call.

Oftentimes, a user is interested in maximizing communication range, and would prefer to utilize a repeater when available. Moreover, in an ongoing communication session, when a repeater is no longer available, it would be desirable to switch to talk-around mode if such localized communication is possible. Channel based mode selection, such as used in prior art systems, more laborious than desired. Therefore, a new method for selecting between repeater mode and talk-around mode is needed.

DETAILED DESCRIPTION OF THE PREFERRED EMBODIMENT

The present invention provides for a method of establishing a call between two subscriber units, by automatically selecting repeater access mode, if a repeater is available, and talk-around mode, if a repeater is not available. Generally, a repeater operates using an inbound channel and an outbound channel by retransmitting, at a higher power level, signals received via an inbound channel on an outbound channel. In prior art systems, a call is made by transmitting a call setup request on the inbound channel monitored by the repeater. However, according to the present invention, a subscriber unit establishes a communication session with another by transmitting a call request on the outbound channel, in effect, operating in talk-around mode by default. The subscriber unit then monitors the outbound channel to detect a response from the repeater to the call setup request. If the unit receives a response from the repeater within a predetermined time out period, the unit establishes a communication session with another subscriber unit in repeater mode by transmitting on the inbound channel. If no response is received within the predetermined time out period, the subscriber unit establishes communication with the other subscriber unit using talk-around mode, by transmitting on the outbound channel. In this process, the repeater monitors the outbound channel to determine when a call setup request is transmitted by the subscriber unit. Upon detecting such a call setup request, the repeater transmits setup information on the outbound channel indicating its availability. Next, the repeater switches to monitor the inbound channel and to retransmit, or repeat, signals received via the inbound channel, on the outbound channel.

Figure 1:
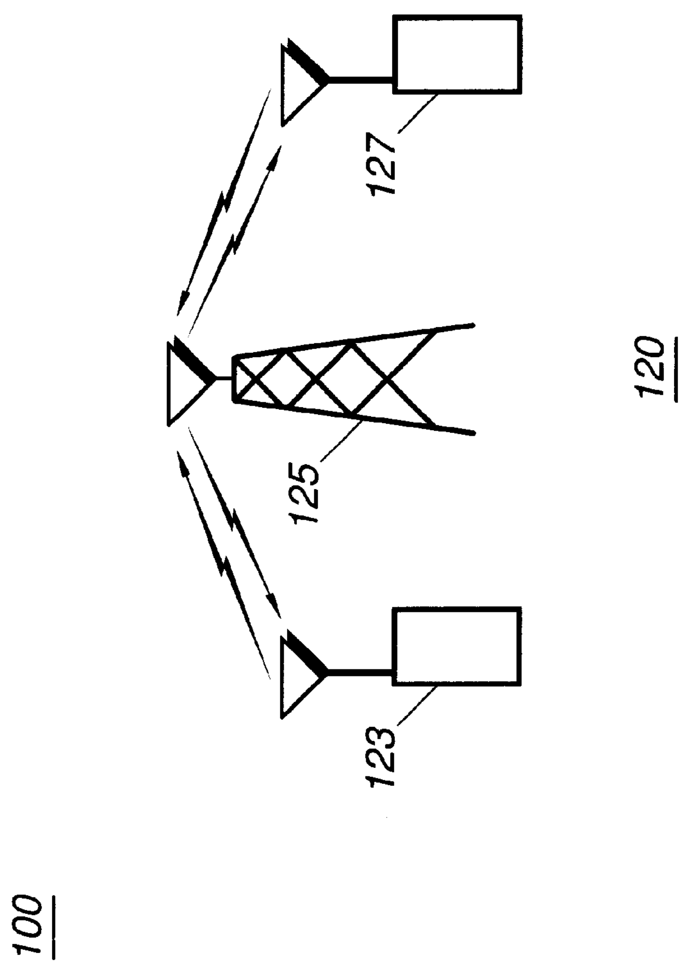
FIG. 1 is a pictorial representation of a radio communication system having a first group of transceivers communicating via talk-around mode, and a second group of transceivers communicating via repeater mode, in accordance with the present invention.

Referring now to FIG. 1, a radio communication system 100 is shown that supports repeater assisted communication, in accordance with the present communication. The radio communication system 100 includes a group of subscriber units 113, 117 communicating via talk-around mode, and a second group of subscriber units 123, 127 communicating with the assistance of infrastructure equipment in the form of a repeater 125. The subscriber units are radio frequency transceivers having communication circuitry for transmitting and receiving over radio frequency channels. In talk-around mode, the subscriber units 113, 117 preferably communicate using a single communication channel. A communication channel can be viewed as an orthogonal communication space, and may be defined by time slots on a particularly frequency channel, such as in a time division multiple access system, or by a particular code assignment in a code division multiple access system, or by a particular frequency range. In a typical example, a particular frequency channel is established, and all transceivers operating in talk-around mode transmit and receive using the particular frequency channel. This arrangement is sometimes referred to as talk-and-listen and is usually implemented using a simplex communication system, i.e., only one communicant is actively transmitting at a given time.

Figure 2:
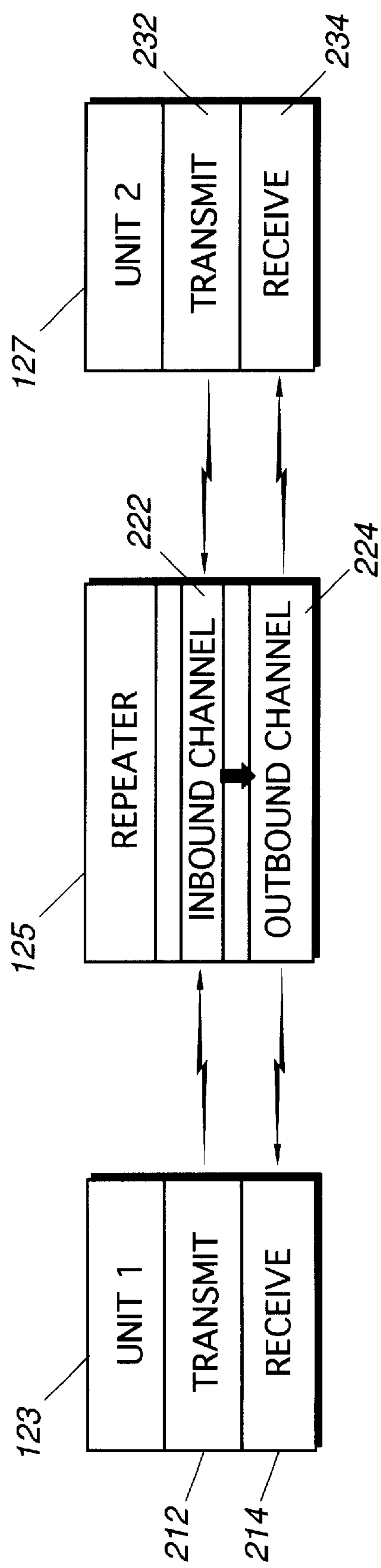
FIG. 2 is a block diagram showing data paths for communication between two transceivers utilizing a repeater, in accordance with the present invention.

Repeater access mode can be better described with reference to FIG. 2, which shows signal paths for repeater assisted communication, in accordance with the present invention. In a typical communication session, both subscriber units 123, 127 have a transmit circuitry 212, 232 that support transmissions on the inbound channel 222 of the repeater 125. At the repeater 125, signals receive via the inbound channel 222 are transmitted on the outbound channel 224, and those signals are received by receiver circuitry 214, 234 at the subscriber units 123, 127.

Figure 3:
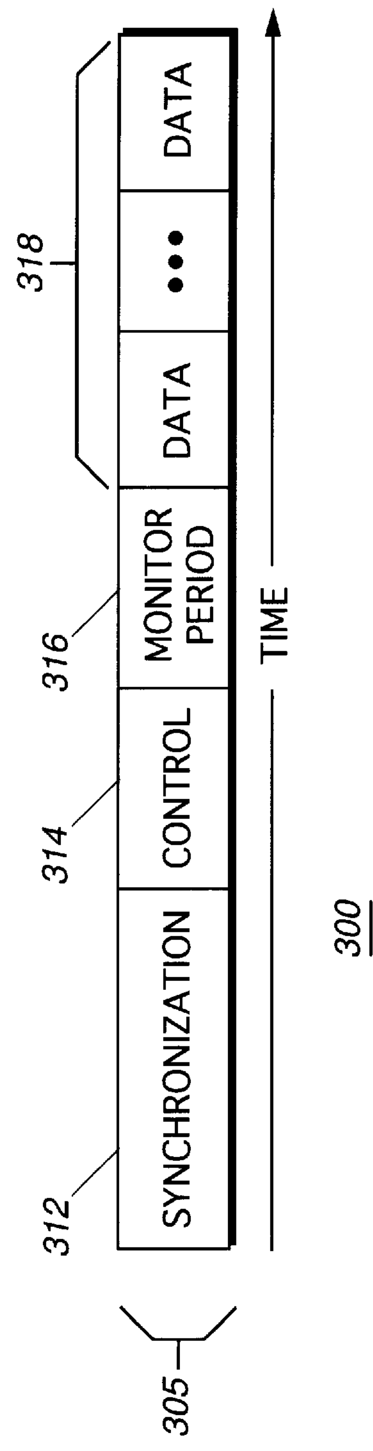
FIG. 3 is a timing diagram showing channel use when operating in talk-around mode, in accordance with the present invention.

FIG. 3 is a timing diagram 300 showing channel use by a subscriber unit establishing a communication session in talk-around mode, in accordance with the present invention. The transmissions on a channel 305 comprises a synchronization packet 312, a control packet 314, and data packets 318. The synchronization packet 312 is transmitted by the subscriber unit to initialize the communication session, and includes information utilized by a target subscriber unit and/or repeater, to establish synchronization of data to be subsequently transmitted. The control packet 314 follows the synchronization packet 312 and includes information that allows the target unit and/or repeater to identify the type of call being initialized. The data packets 318 represent information transmitted after a call is initialized and a communication session established. In accordance with the invention, the timing diagram 300 also shows a monitor period 316, during which the initiating subscriber unit monitors to detect a response from a repeater to the synchronization and control information transmitted on the channel 305. In the preferred embodiment, the channel 305 corresponds to the outbound channel of a repeater as designated in the radio communication system.

Figure 4:
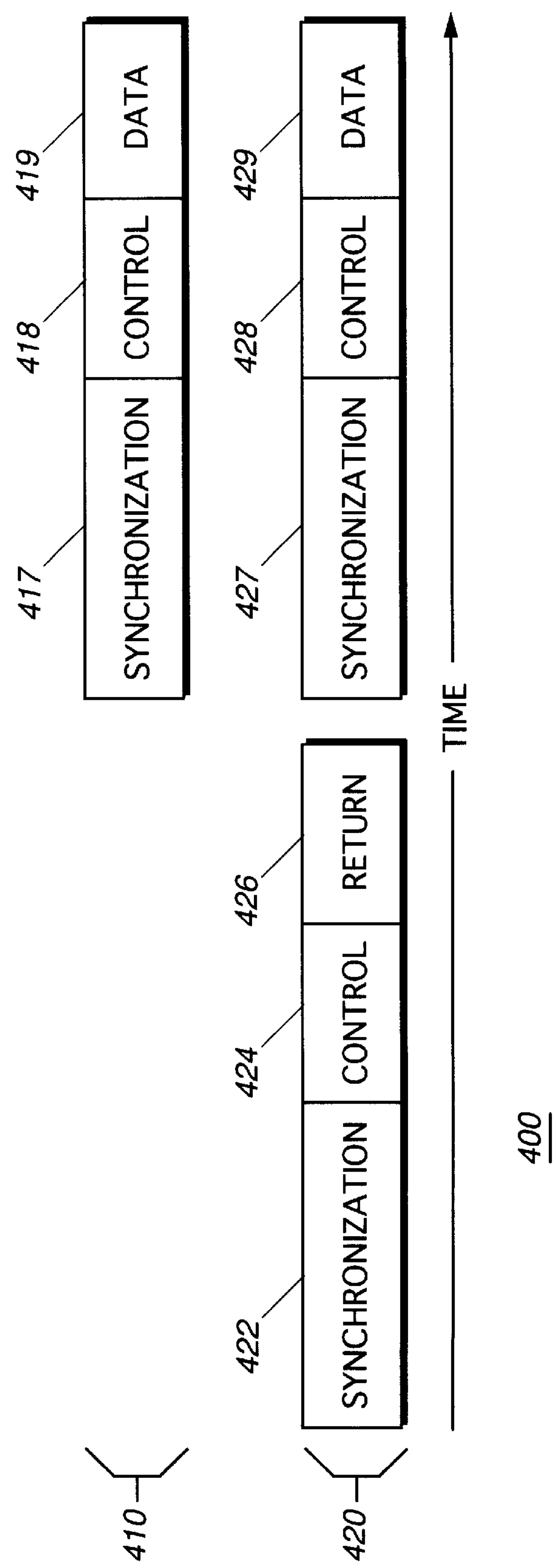
FIG. 4 is a timing diagram showing use of inbound and outbound channels during communication using repeater access mode, in accordance with the present invention.

FIG. 4 is a timing diagram 400 highlighting use of inbound and outbound channels 410, 420 for establishing a communication session in repeater access mode, in accordance with the present invention. As with talk-around mode, in repeater mode, synchronization and control packets 422, 424 are transmitted on the outbound channel 420 during call initiation. However, if a repeater is available, a return packet 426 containing call setup information is transmitted by the repeater on the outbound channel 420. On the inbound channel 410, synchronization and control packets 417, 418 are again transmitted by the subscriber unit followed by data packets 419. On the outbound channel 420, the synchronization, control, and data packets 427, 428, 429 received via the inbound channel 410 are retransmitted.

Figure 5:
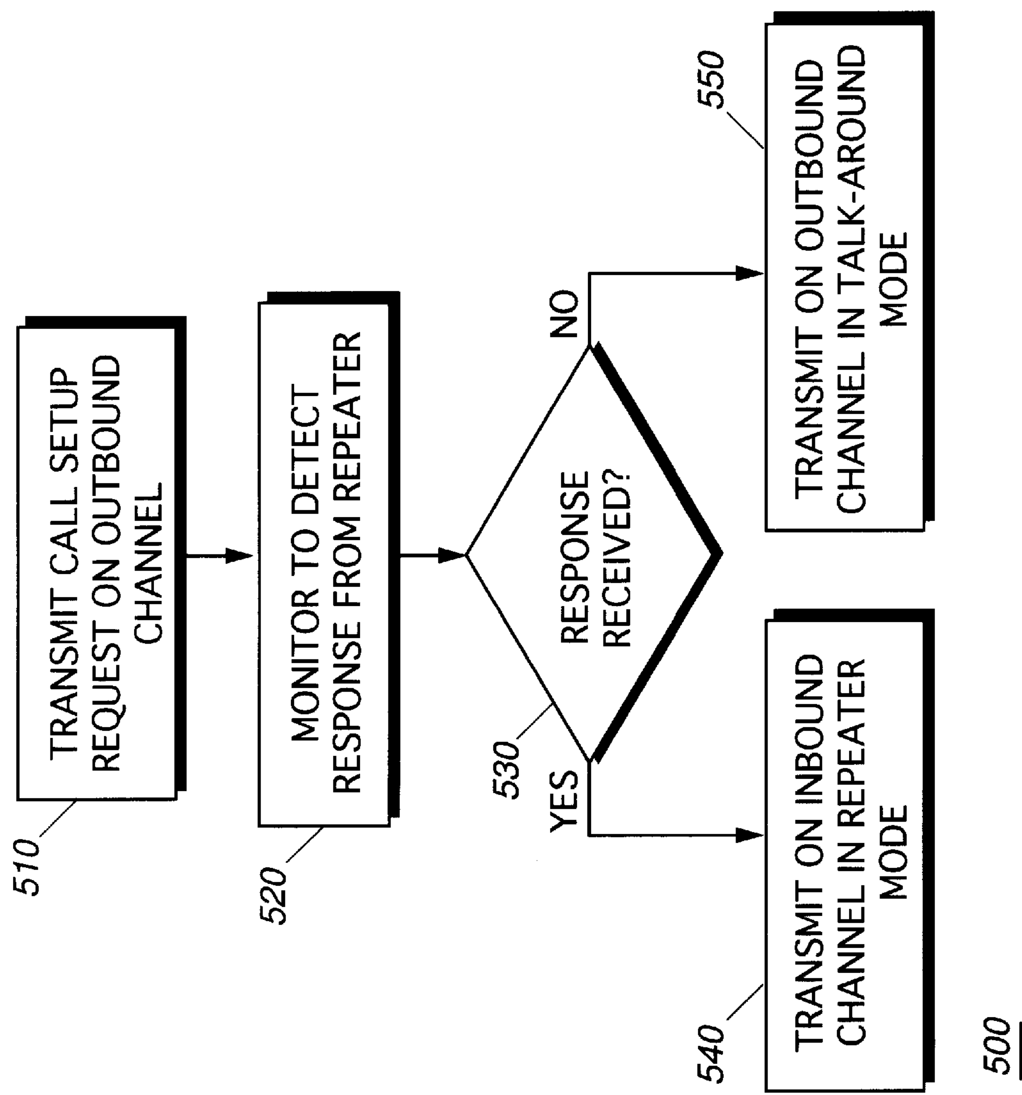
FIG. 5 is a flowchart of procedures used by a subscriber unit during a communication session with another subscriber unit using either talk-around mode or repeater mode, in accordance with the present invention.

FIG. 5 shows a flowchart of procedures 500 used by an initiating subscriber unit to establish a communication session in either talk-around mode or repeater mode, in accordance with the present invention. Upon receiving a request from a user to initiate a call, the subscriber unit defaults to talk-around mode and transmits a call setup request on the outbound channel, step 510. The call setup request comprises a synchronization packet and a control packet as previously described with respects to FIGS. 3 and 4. The initiating subscriber unit then monitors the outbound channel for a particularly timeout period, to detect a response from the repeater to the call setup request, step 520. Upon receiving a response from the repeater within the timeout period, the initiating subscriber unit establishes a communication session with the target subscriber unit in repeater mode by transmitting on the inbound channel, steps 530, 540. In the preferred embodiment, the initiating subscriber unit retransmits the call setup request previously transmitted on the outbound channel on the inbound channel. Preferably, the initiating subscriber unit remains in repeater mode for subsequent call initiations, for at least some period of time, after completing the established communication session, and automatically reverts to talk-around mode after expiration of such timeout period. If no response is received from the repeater within the timeout period, the initiating subscriber unit establishes a communication session with the target subscriber unit in talk-around mode by transmitting on the outbound channel, steps 530, 550. Thus, the initiating subscriber unit automatically selects between talk-around mode or repeater mode depending on the availability of a repeater.

Figure 6:
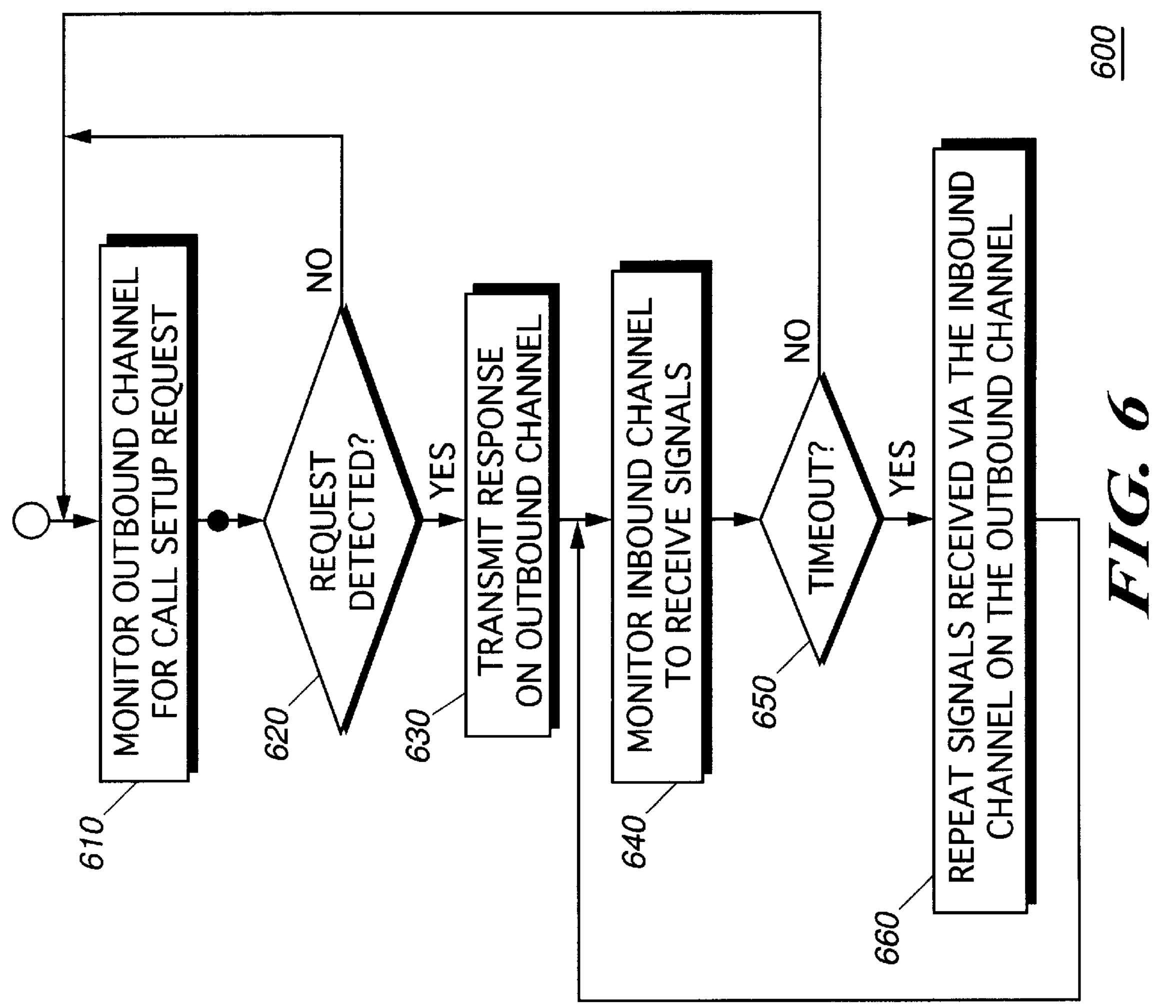
FIG. 6 is a flowchart of procedures used by a repeater for call setup purposes, in accordance with the present invention.

FIG. 6, shows a flowchart of procedures 600 used by a repeater to support call setup according to the protocol of the present invention. When not engaged in an ongoing communication session, the repeater monitors the outbound channel to detect a call setup request transmitted by a particular remote subscriber unit, step 610. Upon detecting a call setup request, the repeater transmits setup information, in the form of a return packet, on the outbound channel to the particular remote subscriber unit indicating availability of the repeater, step 630. The repeater then switches to monitor the inbound channel to receive signals from the subscriber unit, step 640. The repeater continues to retransmit or repeat signals transmitted via the inbound channel on the outbound channel until a timeout period expires during which no incoming signal is received by the repeater on the inbound channel, steps 640, 650, 660. When such timeout occurs, the repeater resumes the monitoring of the outbound channel, step 610. Accordingly, the repeater supports the communication protocol according to the present invention by monitoring its outbound channel for incoming messages that signify the start of a communication session for which the repeater may provide assistance.

The present invention provides significant advantages over the prior art. A user is no longer required to predetermine the availability of a repeater and select different channels for talk-around mode or repeater mode depending on the availability of the repeater. The user is automatically switched to talk-around mode when no repeater is available, and automatically utilizes a repeater when the repeater is available. Such communication protocol as described herein represents a significant advance in the art.

What is claimed is:

1. In a radio communication system having a repeater that operates to retransmit, on an outbound channel, signals received via an inbound channel, a method for establishing a call between a first subscriber unit and a second subscriber unit operating within the system, the method comprising the steps of:

at the first subscriber unit:

(a) transmitting a call setup request on the outbound channel;

(b) monitoring the outbound channel for a first time period to detect a response from the repeater to the call setup request;

(c) upon receiving a response from the repeater within the first time period, establishing communication with the second subscriber unit in repeater mode by transmitting on the inbound channel; and (d) upon receiving no response within the first time period, establishing communication with the second subscriber unit in talk-around mode by transmitting on the outbound channel.

2. The method of claim 1, wherein step (c) further comprises the step of transmitting call setup information on the inbound channel.

3. The method of claim 1, further comprising the steps of:

remaining in repeater mode for subsequent call initiations for a second time period after completing communication established in step (d); and automatically reverting to talk-around mode after expiration of the second time period.

4. The method of claim 1, further comprising the steps of:

at the repeater:

(e) monitoring the outbound channel to detect the call setup request transmitted by the first subscriber unit; and (f) transmitting setup information on the outbound channel in response to a call setup request detected on the outbound channel.

5. The method of claim 4, wherein step (f) further comprises the step of transmitting information to the first subscriber unit signaling information indicating that the first subscriber unit should operate in repeater mode.

6. The method of claim 4, further comprising the steps of, after step (f):

at the repeater:

(g) receiving signals on the inbound channel and retransmitting received signals on the outbound channel;

(h) resuming the monitoring of step (e), when a time-out period expires during which no incoming signal is received on the inbound channel.

7. The method of claim 4, wherein the call setup request comprises a synchronization packet, and a control packet.

8. In a radio communication system having infrastructure equipment and first and second subscriber units capable of communicating with each other aided or unaided by the infrastructure equipment, a method comprising the steps of:

at the first subscriber unit, automatically:

(a) transmitting a call setup request on a first communication channel;

(b) monitoring the first communication channel, for a first time period, for a response from the infrastructure equipment to the call setup request;

(c) communicating with the second subscriber unit, aided by the infrastructure equipment, by transmitting on a second communication channel, upon receiving a response to the call setup within the first time period; and (d) communicating with the second subscriber unit unaided by the infrastructure equipment, by transmitting on the first communication channel, upon receiving no response within the first time period.

9. The method of claim 8, wherein step (a) further comprises the step of transmitting synchronization and control information on the first communication channel.

10. The method of claim 9, wherein step (a) further comprises the step of transmitting synchronization and control information on the first communication channel.

11. The method of claim 10, wherein step (c) further comprises the step of retransmitting the synchronization and control information followed by data on the second communication channel.

12. The method of claim 11, wherein step (d) further comprises the step of transmitting data after transmitting the synchronization and control information.

13. The method of claim 12, wherein the infrastructure equipment comprises a repeater and the first and second communication channels are outbound and inbound channels, respectively, used by the repeater.

14. The method of claim 10, wherein:

step (c) further comprises the step of communicating with the second subscriber unit in repeater mode; and step (d) further comprises the step of communicating with the second subscriber unit in talk-around mode.

* * * * *